(12) United States Patent
Imai

(10) Patent No.: US 10,708,513 B2
(45) Date of Patent: Jul. 7, 2020

(54) SHUTTER APPARATUS AND IMAGING APPARATUS

(71) Applicant: CANON KABUSHIKI KAISHA, Tokyo (JP)

(72) Inventor: Rentaro Imai, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/207,537

(22) Filed: Dec. 3, 2018

(65) Prior Publication Data
US 2019/0199903 A1 Jun. 27, 2019

(30) Foreign Application Priority Data
Dec. 21, 2017 (JP) ................. 2017-244697

(51) Int. Cl.
*H04N 5/235* (2006.01)
*G03B 9/18* (2006.01)
*G03B 9/42* (2006.01)
*G03B 19/12* (2006.01)

(52) U.S. Cl.
CPC ............. *H04N 5/2353* (2013.01); *G03B 9/18* (2013.01); *G03B 9/42* (2013.01); *G03B 19/12* (2013.01)

(58) Field of Classification Search
CPC ............... G03B 9/18; G03B 9/20; G03B 9/36
See application file for complete search history.

(56) References Cited

U.S. PATENT DOCUMENTS

| 6,850,281 B2* | 2/2005 | Takahashi | G03B 9/18 348/363 |
| 8,786,770 B2* | 7/2014 | Shintani | G03B 9/36 348/374 |
| 8,834,043 B2* | 9/2014 | Niwamae | G03B 9/36 396/443 |
| 8,876,416 B2* | 11/2014 | Sakai | G03B 9/36 396/489 |
| 9,715,161 B2* | 7/2017 | Niwamae | G03B 7/00 |

FOREIGN PATENT DOCUMENTS

JP 2014-178569 A 9/2014

* cited by examiner

*Primary Examiner* — Noam Reisner
*Assistant Examiner* — Leon W Rhodes, Jr.
(74) *Attorney, Agent, or Firm* — Cowan, Liebowitz & Latman, P.C.

(57) ABSTRACT

A shutter apparatus includes a blade unit configured to open and close an opening used for exposure, a blade moving member configured to move the blade unit between an open position and a closed position of the opening, an urging member configured to urge at least one of the blade unit and the blade moving member in a direction from the closed position to the open position of the opening; and a blade cam member configured to contact the blade moving member as the blade unit moves from the closed position to the open position of the opening.

16 Claims, 13 Drawing Sheets

SHUTTER APPARATUS AND IMAGING APPARATUS

BACKGROUND OF THE INVENTION

Field of the Invention

The present invention relates to a shutter apparatus and an imaging apparatus.

Description of the Related Art

A shutter apparatus, such as a focal plane shutter, charges a driving member that drives a blade unit while engaging (or locking) the blade unit and then disengages (or unlocks) a blade moving member connected to the blade unit, and the blade unit thereby moves from the closed state of the exposure opening to the open state (return running). Thereafter, the driving member is released, the electromagnet is turned off at a predetermined timing, and the driving member and the blade moving member are integrated and the blade unit runs in a direction of closing the exposure opening (normal running). When the two types of running methods are compared with each other, a pressure of the return running particularly in the running completion of the blade unit is smaller than that of the normal running, and thus it takes a long time to stabilize the operation of the blade unit after the blade unit completes running.

Japanese Patent Laid-Open No. ("JP") 2014-178569 proposes a shutter apparatus that quickly converges bounds caused in the return running by providing a bound lock lever that is movable between a position for restricting a blade lever from moving and a derestricting position.

The shutter apparatus proposed in JP 2014-178569 can suppress the bounds of the blade unit caused by the return running, but cannot reduce the impact itself caused by the return running of the blade unit and has a limit of improving the continuous capturing (or shooting) frame rate.

SUMMARY OF THE INVENTION

The present invention provides a shutter apparatus and an imaging apparatus which enables a blade unit to stabilize after performing return running.

A shutter apparatus according to one aspect of the present invention includes a blade unit configured to open and close an opening used for exposure, a blade moving member configured to move the blade unit between an open position and a closed position of the opening, an urging member configured to urge at least one of the blade unit and the blade moving member in a direction from the closed position to the open position of the opening, and a blade cam member configured to contact the blade moving member as the blade unit moves from the closed position to the open position of the opening.

An imaging apparatus according to another aspect of the present invention includes the above shutter apparatus, and an image sensor configured to capture an image of an object through the shutter apparatus.

Further features of the present invention will become apparent from the following description of exemplary embodiments with reference to the attached drawings.

DESCRIPTION OF THE EMBODIMENTS

Figure 1:
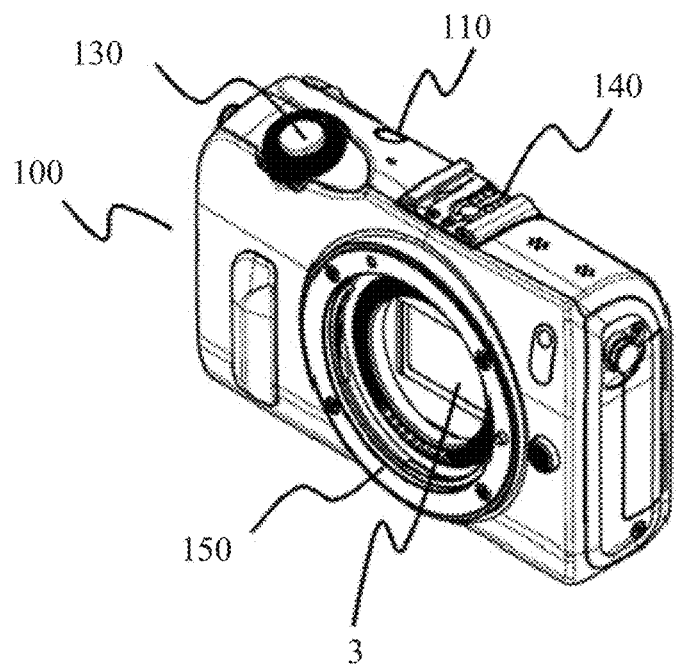
FIG. 1 is a perspective view of an imaging apparatus mounted with a focal plane shutter as an illustrative shutter apparatus according to an embodiment of the present invention.

FIG. 1 is a perspective view of an imaging apparatus 100 mounted with a focal plane shutter as an illustrative shutter apparatus according to an embodiment of the present invention. The image capturing apparatus 100 has an electronic shutter and a continuous capturing function. An accessory shoe 140 used to attach an imaging accessory, such as a power button 110, a release button 130, and a strobe unit, is provided on the top surface of the imaging apparatus 100. A lens mount 150 is an attachment unit of an unillustrated lens unit (imaging lens or interchangeable lens).

Since the imaging apparatus 100 is a non-reflex type imaging apparatus, a shutter curtain is open in an imaging standby state for the live-view display. Therefore, as illustrated in FIG. 1, an imaging plane in the image sensor 3 exposes when the lens unit is detached. In other words, FIG. 1 illustrates a camera body in a camera system that includes an interchangeable lens (lens apparatus) and the camera body (imaging apparatus). The present invention is also applicable to a lens integrated type or single-lens reflex camera. The interchangeable lens includes a lens unit 1 and a lens controller 12 illustrated in FIG. 2.

Figure 2:
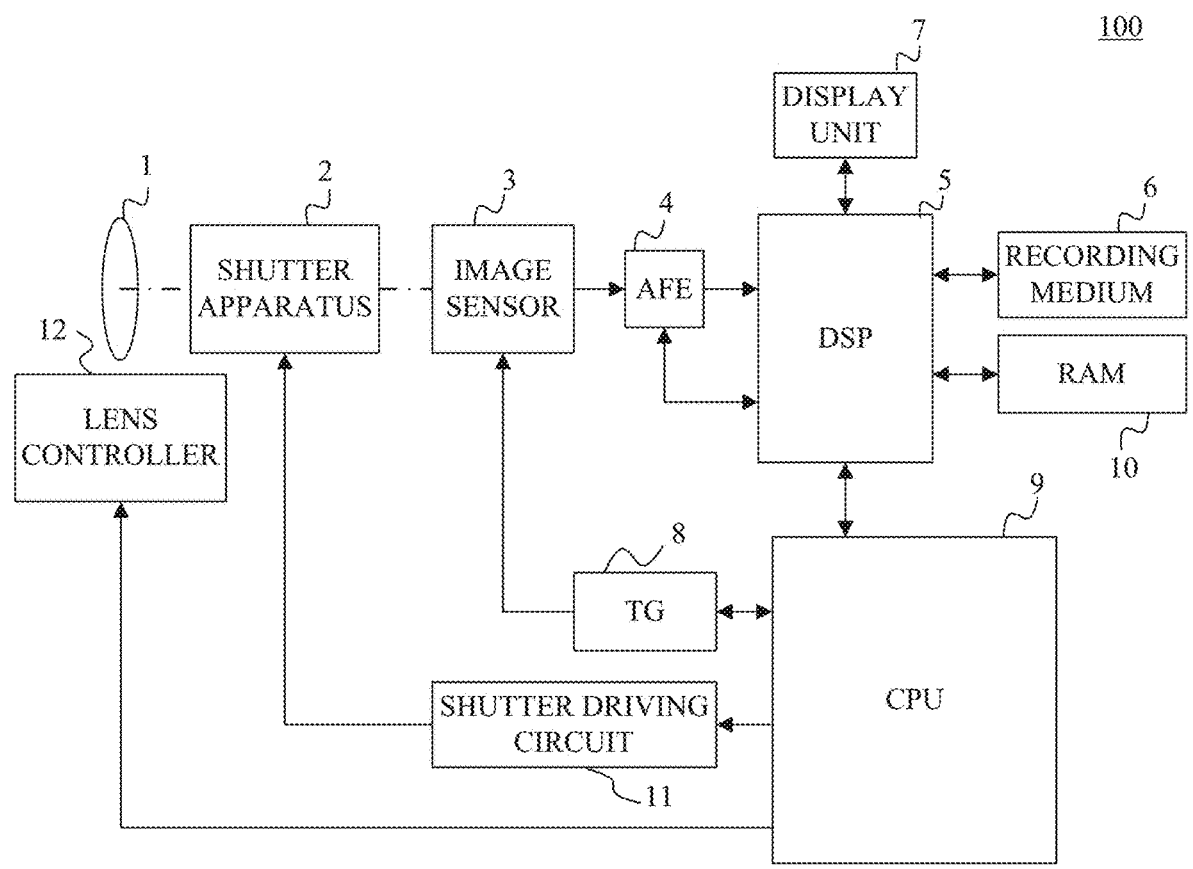
FIG. 2 is a block diagram of the imaging apparatus illustrated in FIG. 1.

FIG. 2 is a block diagram of the imaging apparatus 100. A shutter apparatus 2 is provided on an imaging optical path between the lens unit 1 for imaging light from an object and an image sensor 3, such as a CMOS image sensor, and adjusts an exposure time of the image sensor 3 in association with an electronic front curtain operation of the image sensor 3.

The lens unit 1 serves as an imaging optical system that forms an optical image of an object (object image). The image sensor 3 photoelectrically converts the object image formed by the lens unit 1. An analog image signal output from the image sensor 3 is converted into a digital signal by an AFE (Analog Front End) 4. A DSP (digital signal processor) 5 performs various image processing, compression/decompression processing, and the like for the digital image signal output from the AFE 4.

A recording medium 6 may be a non-transitory computer readable medium that records image data processed by the DSP 5 and a program. A display unit 7 uses a liquid crystal display (LCD) or the like, and displays a captured image, various menu screens, and the like. A TG (Timing Generator) 8 supplies a drive signal to the image sensor 3. A RAM 10 is connected to the DSP 5 and temporarily stores image data and the like. A shutter driving circuit 11 drives the shutter apparatus 2.

A CPU 9 (microcomputer) is a camera controller for controlling the AFE 4, the DSP 5, the TG 8, and the shutter driving circuit 11, and has a timekeeper such as an unillustrated memory and clock generator. The memory includes a ROM and a RAM, and stores a shutter driving program according to this embodiment and information necessary for it. The shutter driving program is a computer program for enabling a computer to execute the shutter driving method according to this embodiment. The timekeeper measures a predetermined time.

A lens controller 12 outputs to the CPU 9 lens information, such as a focal length, an aperture diameter, a pupil diameter, a distance between a pupil and the image sensor 3 of the lens unit 1, and drives a diaphragm, a lens, etc. under control of the CPU 9.

Figure 3A:
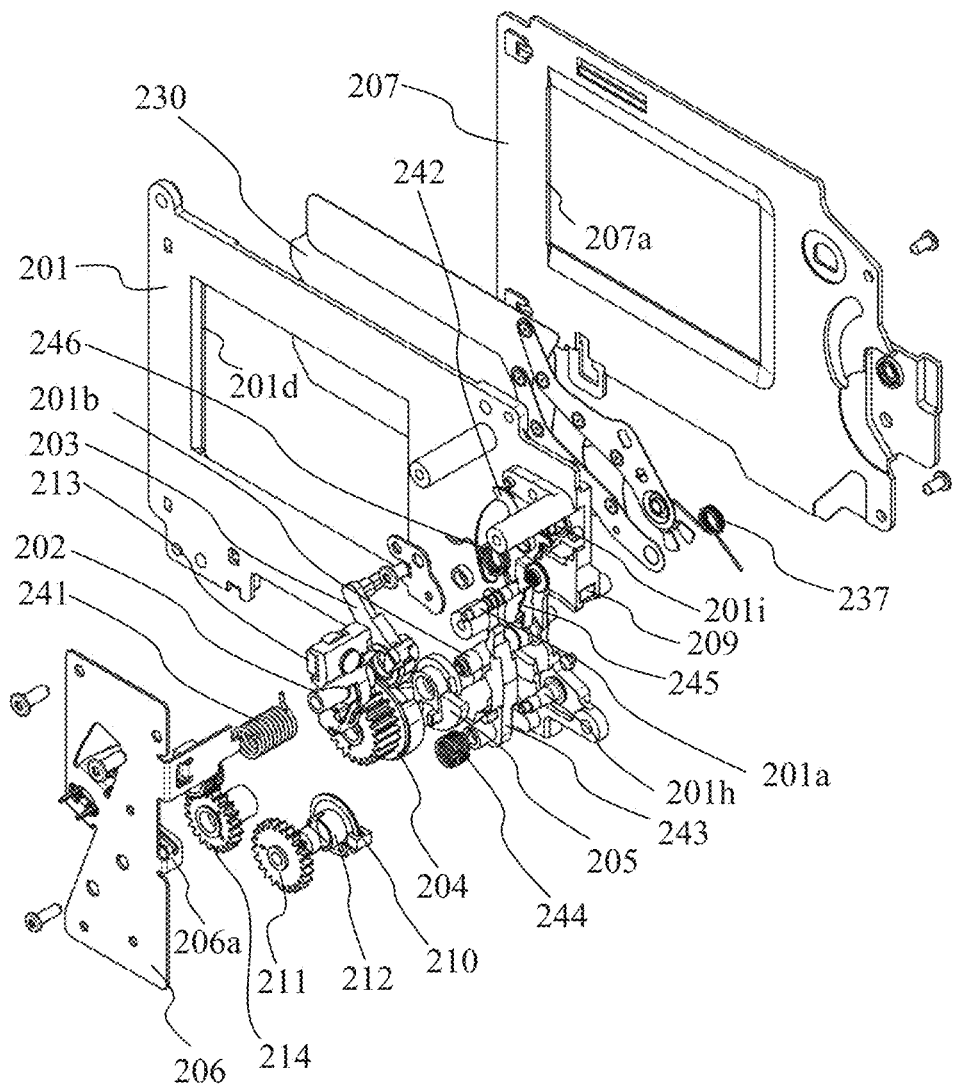
FIGS. 3A and 3B are exploded perspective views of the shutter apparatus illustrated in FIG. 2.
Figure 3B:
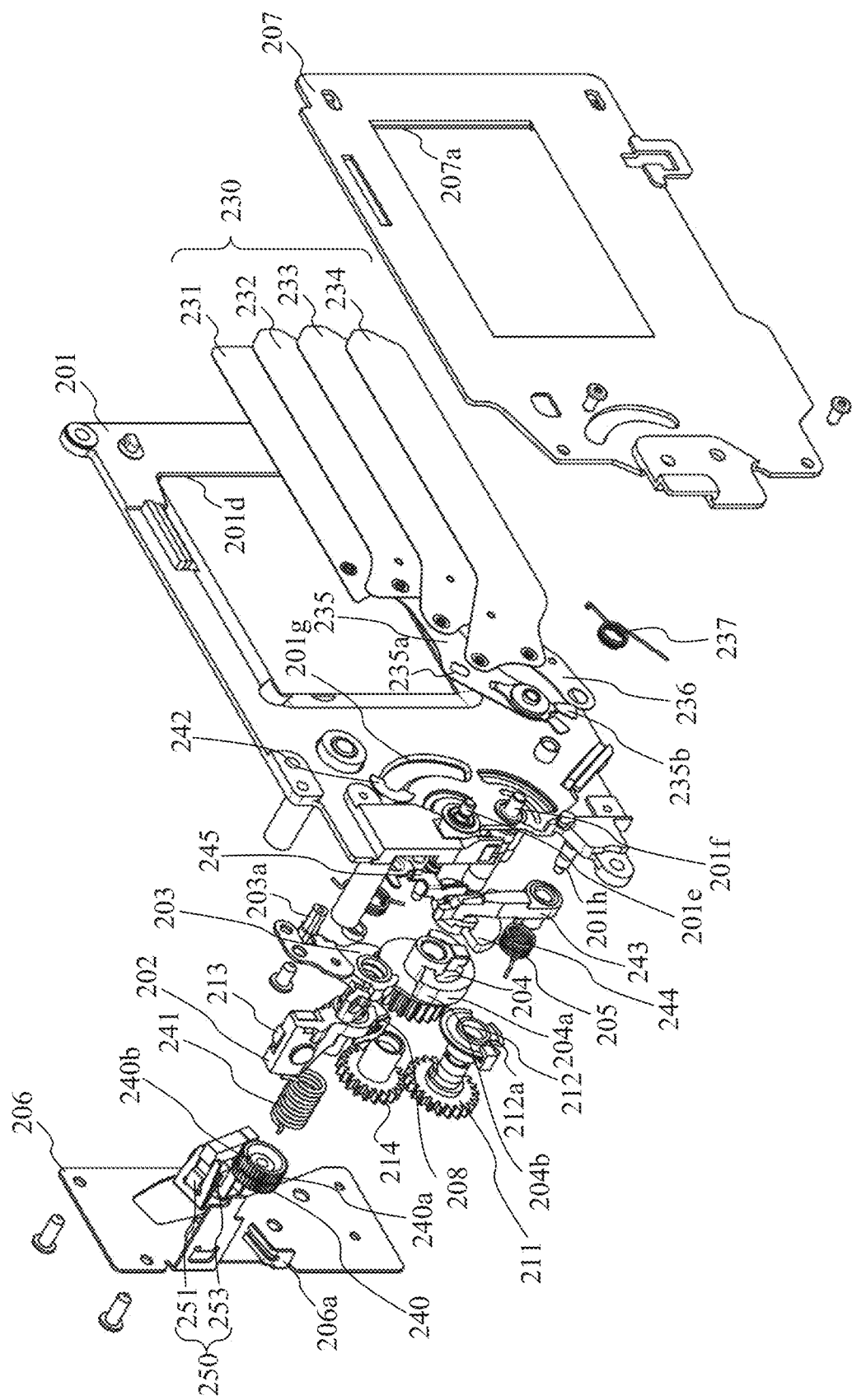
Figure 4:
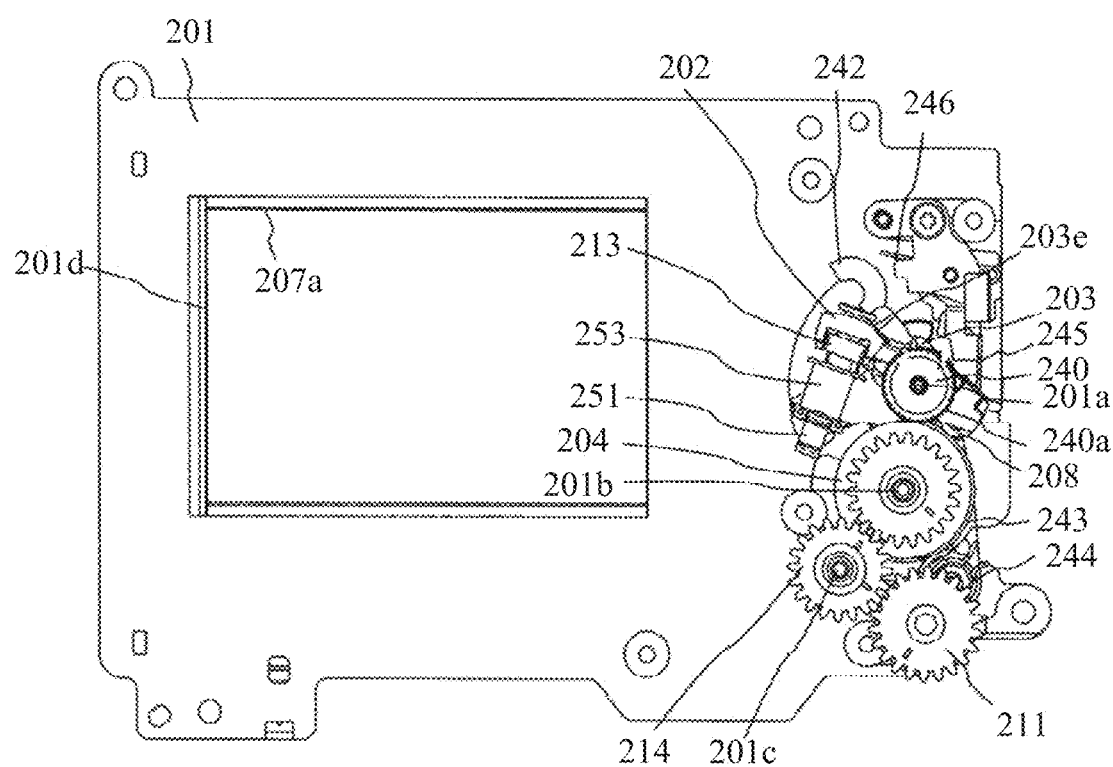
FIG. 4 is a rear view of the shutter apparatus illustrated in FIG. 2.

FIGS. 3A and 3B are exploded perspective views of the shutter apparatus 2. FIG. 3A is an exploded perspective view of the shutter apparatus 2 viewed from the image sensor 3 side (referred to as a "backside" hereinafter), and FIG. 3B is an exploded perspective view viewed from the side where the lens unit is attached (referred to as a "front side" hereinafter). FIG. 4 is a rear view of the shutter apparatus 2. For easy viewing of the drawing, an auxiliary base plate 206 is omitted.

A shutter base plate (first shutter substrate) 201 is fixed inside the imaging apparatus 100, and each component constituting a driving mechanism in a blade unit (shutter blade) 230 is attached. Each of a driving member 202, a blade moving member 203, a cam gear 204, a blade cam 205, a blade lock member 243, and a bound lock member 245 is rotatably supported on the shutter base plate 201.

Each pair of the driving member 202 and the blade moving member 203, the cam gear 204 and the blade cam 205 is rotatably supported coaxially with a shaft 201a and a shaft 201b, respectively. Thus, the entire shutter apparatus can be made smaller. The cam gear 204 and the blade cam 205 are integrally rotated by a driving force transmitted from an unillustrated motor driven by the shutter driving circuit 11 via an unillustrated reduction gear train. The shutter driving circuit 11, the motor, the reduction gear train, etc. constitute a driver configured to drive the cam gear 204 and the blade cam 205. In this embodiment, when the driving force transmitted to the cam gear 204 is transmitted to the driving member 202, a charge operation (which transfers the blade unit to the imaging standby state) is performed.

The auxiliary base plate 206 is engaged with tips of the shafts 201a, 201b, and 201c of the shutter base plate 201 and attached to the shutter base plate 201. An electromagnet 250 is fixed onto the auxiliary base plate 206.

A cover plate 207 (second shutter substrate) is fixed onto the shutter base plate 201 and disposed closer to the image sensor than the shutter base plate 201. At the center of the cover plate 207, an opening 207a used for the exposure (for an imaging light flux) is formed at a position corresponding to an opening 201d used for the exposure (for an imaging light flux) formed on the shutter base plate 201 when assembled. A blade chamber for housing the blade unit 230 attached to the blade moving member 203 is formed between the shutter base plate 201 and the cover plate 207.

The blade unit 230 includes a first blade 231, a second blade 232, a third blade 233, and a fourth blade 234, each of which is coated with black paint, and opens and closes openings 201d and 207a. An opening area is formed by the top of the first blade 231 in the running direction (referred to as an "opening forming end" hereinafter) and the opening 207a. Each of the blades is rotatably supported by a main arm (first arm) 235 and a sub arm (second arm) 236 which are blade arm members and form a parallel link.

The main arm 235 and the sub arm 236 are sequentially arranged from the opening forming end side of the blade unit 230 in the running direction. The main arm 235 is rotatably supported on a shaft 201e provided on the opposite side and coaxial with the shaft 201a on the shutter base plate 201. The sub arm 236 is rotatably supported on a shaft 201f provided on the shutter base plate 201, and has a return running spring 237 that urges in a direction opposite to the running direction of the blade unit 230 in imaging. Thus, the return running spring 237 is a first urging (or forcing) member supported coaxially with the blade moving member 203, and configured to urge at least one of the blade unit 230 and the blade moving member 203 (the blade moving member 203 in this embodiment) in a direction from the closed position (closed state) to the open position (open state) of the openings 201d and 207a.

Figures 12A, 12B:
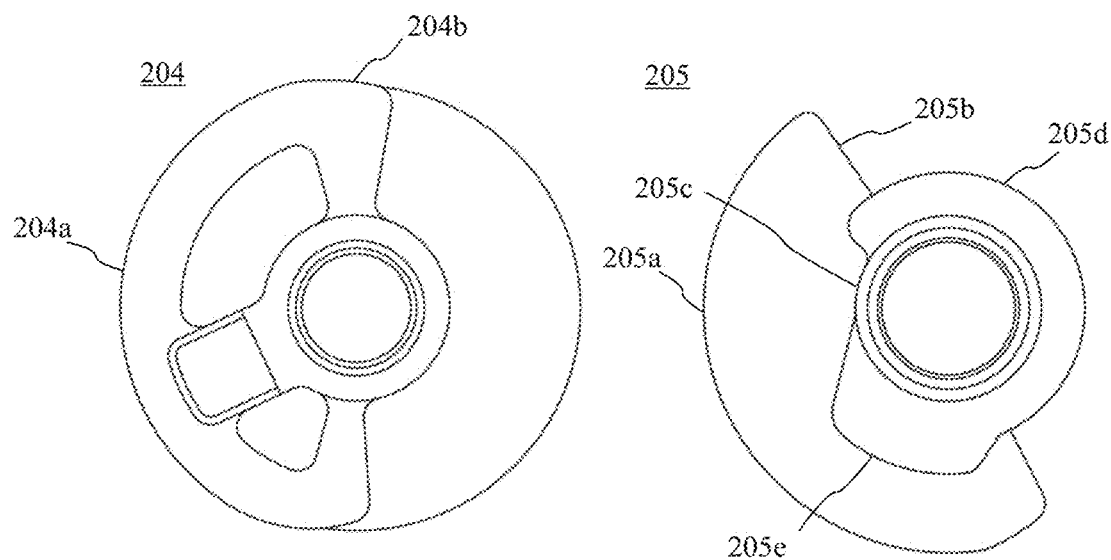
FIGS. 12A and 12B are plan views illustrating a cam gear and a blade cam illustrated in FIGS. 3A and 3B.

The cam gear 204 (drive cam member) moves the driving member 202 from the closed position to the open position of the openings 201d and 207a against the urging force of the blade driving spring 241. As illustrated in FIGS. 3B and 12A which will be described later, the cam gear 204 has a semi-cylindrical shape (although the section may be a sector rather than a perfect semicircle). The cam gear 204 has a cam top portion 204a corresponding to a semicircular arc of a semicircle shape (or a cylindrical surface shape), a cam inclined portion 204b having a planar shape inclined from the cam top portion 204a toward the rotation center side, and a cam bottom. As the cam gear 204 rotates, the cam top portion 204a and the cam inclined portion 204b contact a charge roller 208 provided on the driving member 202 to rotate the driving member 202. When the charge roller 208 contacts the cam top portion 204a, the cam gear 204 can be engaged with the drive member 202. When the charge roller 208 contacts the cam inclined portion 204b, the force for engaging the driving member 202 with the cam gear 204 becomes weaker. The driving member 202 integrally moves the blade moving member 203 from the open position (open state) to the closed position (closed state) of the openings 201d and 207a.

The blade cam 205 (blade cam member) is supported coaxially with the drive cam member 204 and contacts the blade moving member 203. More specifically, the blade cam 205 contacts the blade moving member 203 as the blade unit 230 moves from the closed position to the open position of the openings 201d and 207a. The blade moving member 203 contacts and slides along the blade cam 205, and can avoid a sudden collision with the mechanical end (or the return running end position) and shorten the bound time (stabilization time).

As illustrated in FIG. 12B, which will be described later, the blade cam 205 has two cams that rotate the blade moving member 203 and the blade lock member 243, respectively. The blade cam 205 having functions of the two cams can achieve a miniaturization.

The first cam has a semi-cylindrical shape (although the section may be a sector rather than a perfect semicircle). The first cam has a cam top 205a (first portion) corresponding to a semicircular arc of a semicircle (or a cylindrical surface shape) and a return running cam 205b (second portion) (having a planar shape) corresponding to a line in the semicircle in the semicircular cylindrical shape. When the blade unit 230 moves from the closed position to the open position of the openings 201d and 207a, the blade moving member 203 moves from the cam top 205a to the return running cam 205b.

The second cam includes a cam bottom 205c (third cam portion), a running standby portion 205d, and a lock retreat portion 205e.

As the blade cam 205 rotates, the cam top 205a and the return running cam 205b contacts a cam follower 203d in the blade moving member 203 and rotate the blade moving member 203. As the blade cam 205 rotates, the cam bottom 205c, the running standby unit 205d, and the lock retreat unit 205e contact a cam contact portion 243a in the blade lock member 243 and rotate the blade lock member 243. As will be described later, the blade moving member 203 moves from the closed position (closed state) to the open position (open state) while the driving member 202 is locked by the cam gear 204.

The blade moving member 203 moves the blade unit 230 between the open position and the closed position of the openings 201d and 207a integrally with the driving member 202. More specifically, as illustrated in FIG. 3B, a blade driving pin 203a formed at the tip portion of the blade moving member 203 perforates through an elongated hole portion 201g formed in the shutter base plate 201 and is connected to a hole 235a in the main arm 235. As the blade moving member 203 rotates and the blade driving pin 203a moves along the elongated hole portion 201g, the main arm 235 rotates around a shaft 201e on the shutter base plate 201. As the main arm 235 rotates, the blade unit 230 moves between an open state that allows the object light flux to transmit through the opening 201d and a closed state that shields the object light flux. In other words, the blade unit 230 moves so as to open and close the opening 201d.

A ratchet 240 is disposed so that its central axis is coaxial with the shaft 201a. The ratchet 240 is held as a result of that a ratchet teeth 240a is engaged with an engagement portion 206a of an auxiliary base plate 206. A blade driving spring 241 is disposed between the driving member 202 and the ratchet 240. A first end of the blade driving spring 241 is engaged with the driving member 202, and a second end of the blade driving spring 241 is engaged with a slit 240b formed in the ratchet 240. Thus, the blade driving spring 241 is a second urging (or forcing) member that urges the driving member 202 in the clockwise direction in FIG. 4, or in a direction from the open positions to the closed positions of the openings 201d and 207a In order for the blade unit 230 to run at a set speed, the urging force of the blade driving spring 241 is adjusted by rotating the ratchet 240 and by changing the position of the ratchet teeth 240a engaged with the engaging portion 206a.

A blade phase detector 209 (second detector) and a cam phase detector 210 (first detector) are non-contact optical phase detectors and attached to the shutter base plate 201 and an unillustrated gear base plate, and their outputs are supplied to the CPU 9. This embodiment uses a photo-interrupter for the blade phase detector 209 and the cam phase detector 210. At least one of the blade phase detector 209 and the cam phase detector 210 may include the non-contact detector.

A target portion 235b to be detected is formed on the main arm 235, and the blade phase detector 209 and the target portion 235b are used to detect the blade phase. In other words, the rotation positions (rotational phases) of the blade moving member 203 and the blade unit 230 are detected by shielding light from the blade phase detector 209. This embodiment shields the light through the blade moving member 203 when the opening 201d is in the open state. In other words, the blade phase detector 209 outputs a signal of High ("H" hereinafter) in the light shield (open state) and Low ("L" hereinafter) in the non-light shield (closed state).

A cam phase detection gear 211 that rotates at the same rotational speed by the gear connection, is connected to the cam gear 204 via an idler gear 214. A phase plate 212 rotating integrally with the cam phase detection gear 211 has a target portion 212a. A cam phase or a rotational position of the cam gear 204 is detected by the cam phase detector 210 and the detected portion 212a. The cam phase detector 210 outputs the H signal in the light shield and the L signal in the non-light shield.

Unlike the contact type phase detector that causes an aged deterioration, such as a detection failure due to dust and oil, a pattern erosion in a flexible printed circuit board due to chattering, and the like, the noncontact type phase detector used for this embodiment has no such problems and improves the reliability.

An armature 213 is provided to the driving member 202, and an electromagnet 250 is provided to the auxiliary base plate 206. The electromagnet 250 has a yoke 251 and a coil 253 provided on the outer circumference of the yoke 251. When a voltage is applied to the coil 253, a magnetic force is generated in the yoke 251 and can attract the armature 213.

Figure 14:
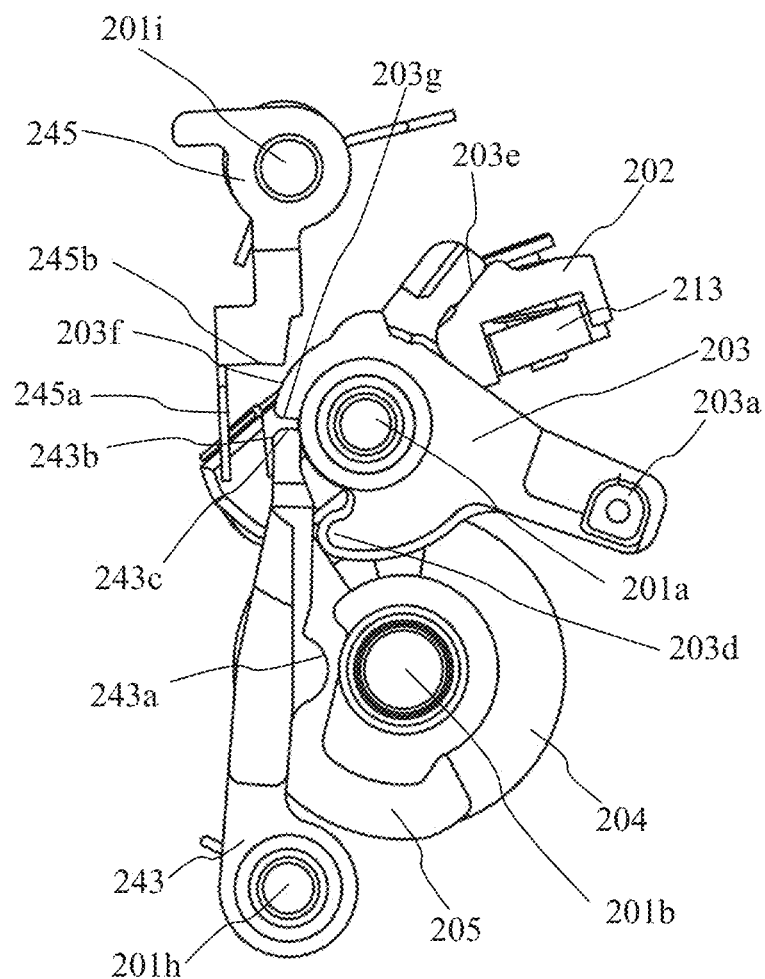
FIG. 14 is a plan view illustrating a lock state of the blade moving member by the blade locking member in FIGS. 5A and 5B.

The blade lock member 243 is rotatably supported around a shaft 201h on the shutter base plate 201 and urged by a blade lock returning spring 244 in the clockwise direction in FIG. 14, as described later, or toward the blade cam 205. A blade lock portion 243c in the blade locking member 243 contacts the blade lock engagement portion 203g in the blade moving member 203, and thereby restricts the blade moving member 203 from rotating.

Figure 13:
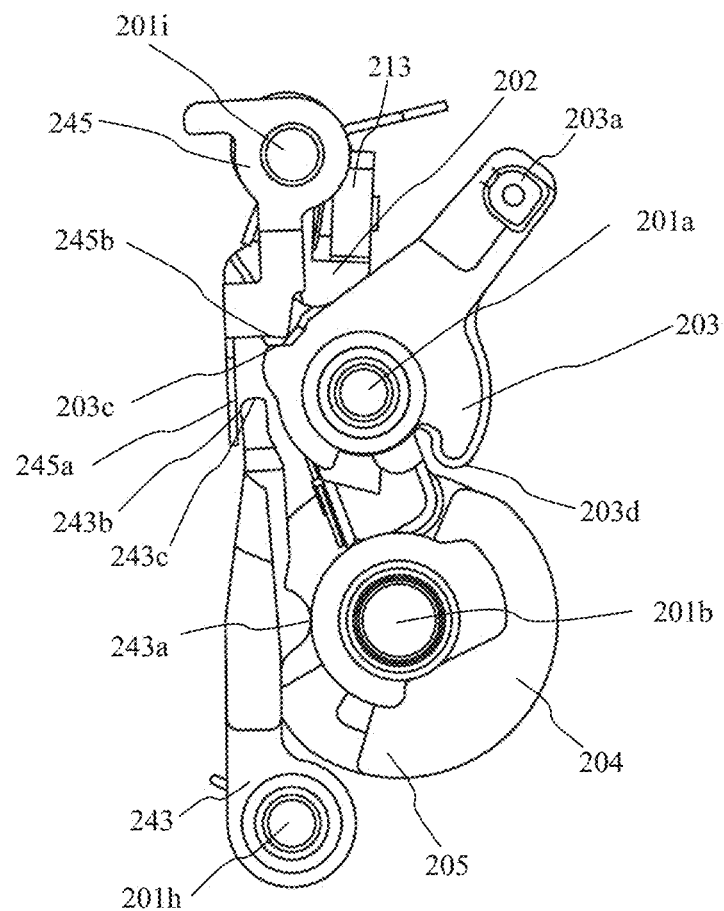
FIG. 13 is a plan view illustrating a lock state of a blade moving member by a bound lock member in FIGS. 7A and 7B.

The bound lock member 245 is rotatably supported around a shaft 201i on the shutter base plate 201 and urged by a bound lock returning spring 246 in a counterclockwise direction in FIG. 13, as described later, or toward the blade moving member 203. A blade lock contact portion 245a in the bound lock member 245 contacts the bound lock contact portion 243b in the blade lock member 243 and the bound lock member 245 is indirectly rotated by the blade cam 205.

Next follows a description of an imaging operation according to this embodiment with reference to FIGS. 5A to 14. In FIGS. 5A to 10B, FIGS. 5A, 6A, 7A, 8A, 9A, and 10A are front views, FIGS. 5B, 6B, 7B, 8B, 9B, and 10B are rear views, and the auxiliary base plate 206, the shutter base plate 201, and the cover plate 207 are omitted for easy viewing of the figures.

Figure 5A:
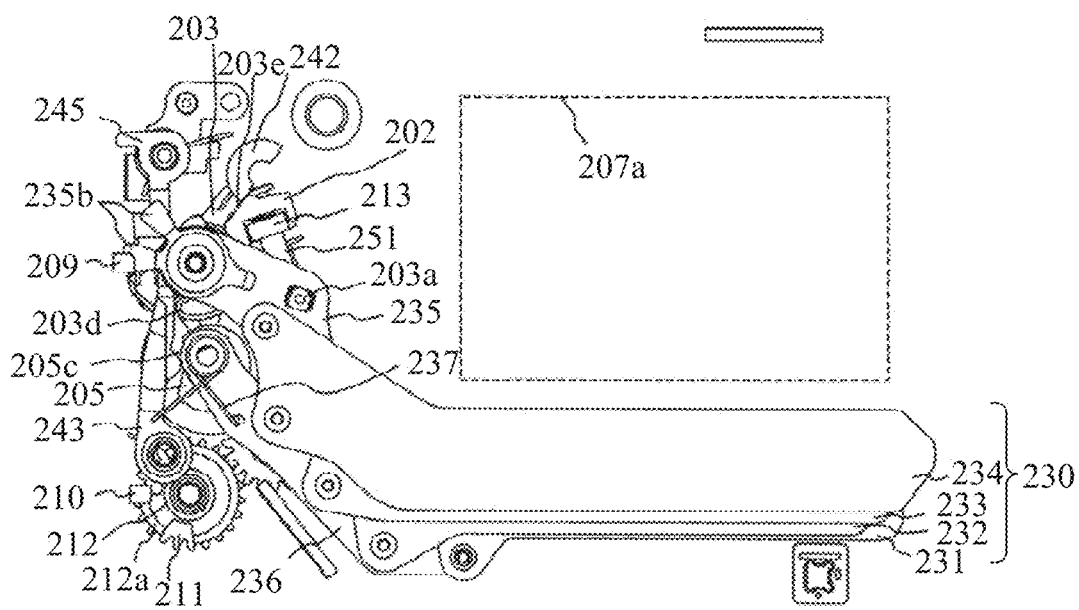
FIGS. 5A and 5B are plan views for explaining an operation of each component in an overcharged state.
Figure 5B:
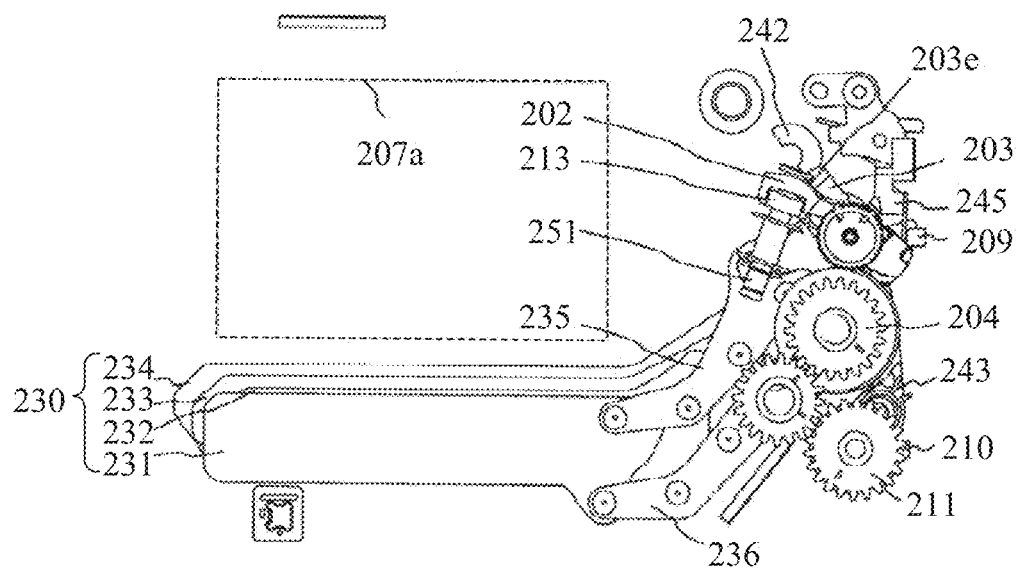
Figure 6A:
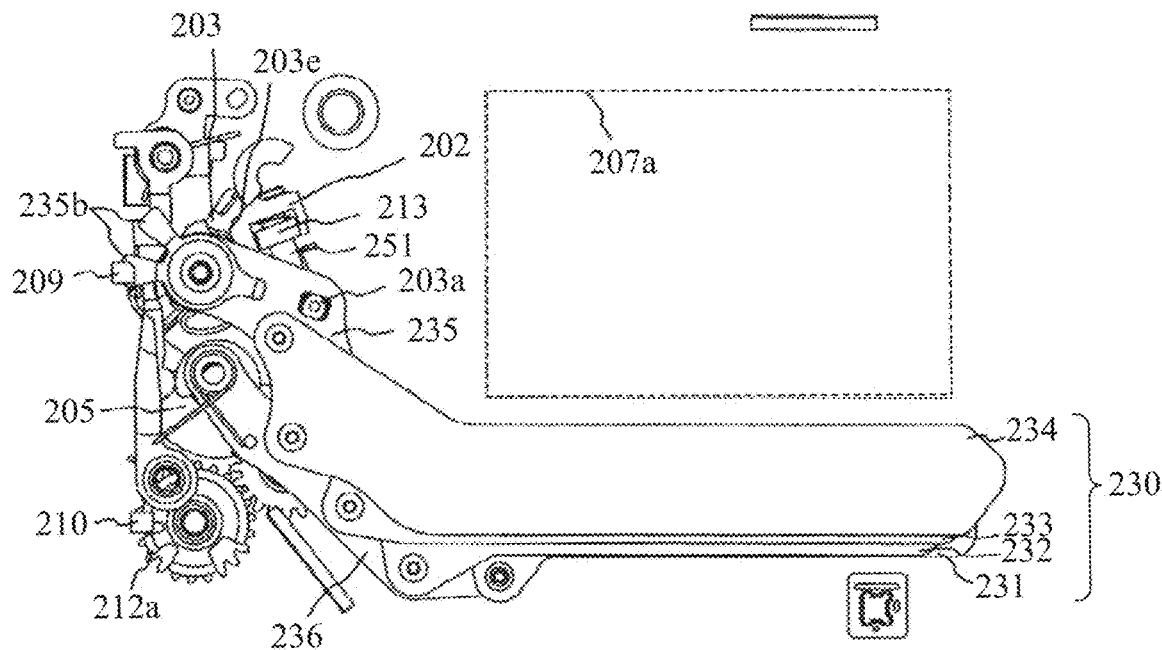
FIGS. 6A and 6B are plan views for explaining an operation of each component in a running standby state of a blade unit.
Figure 6B:
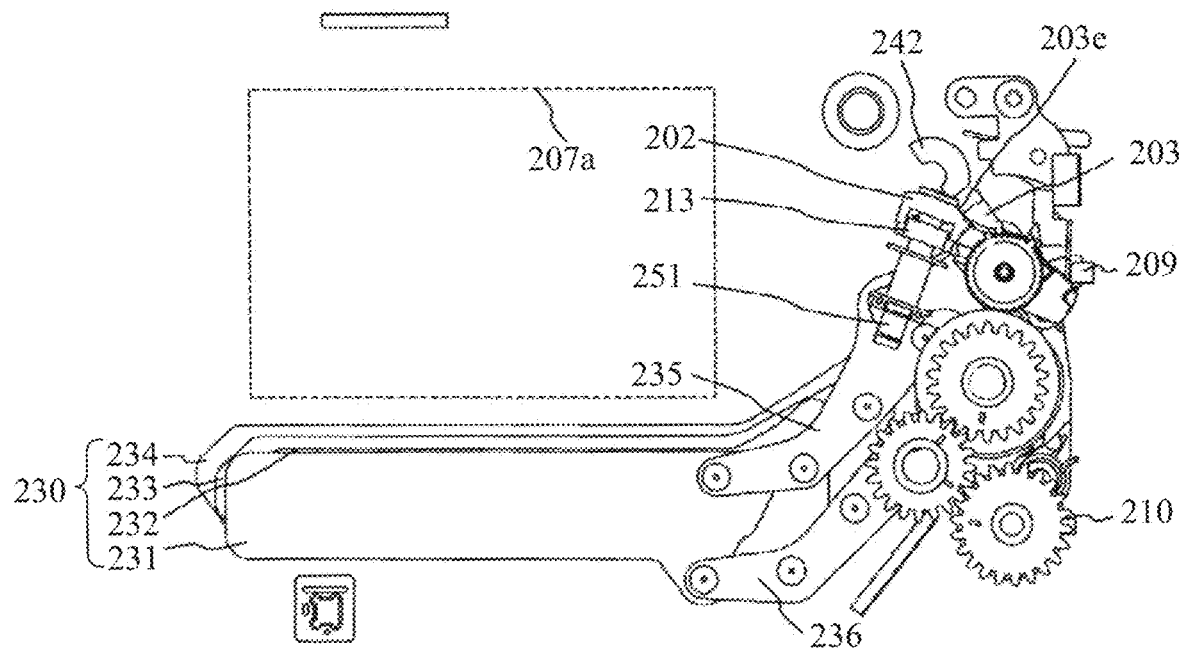
Figure 7A:
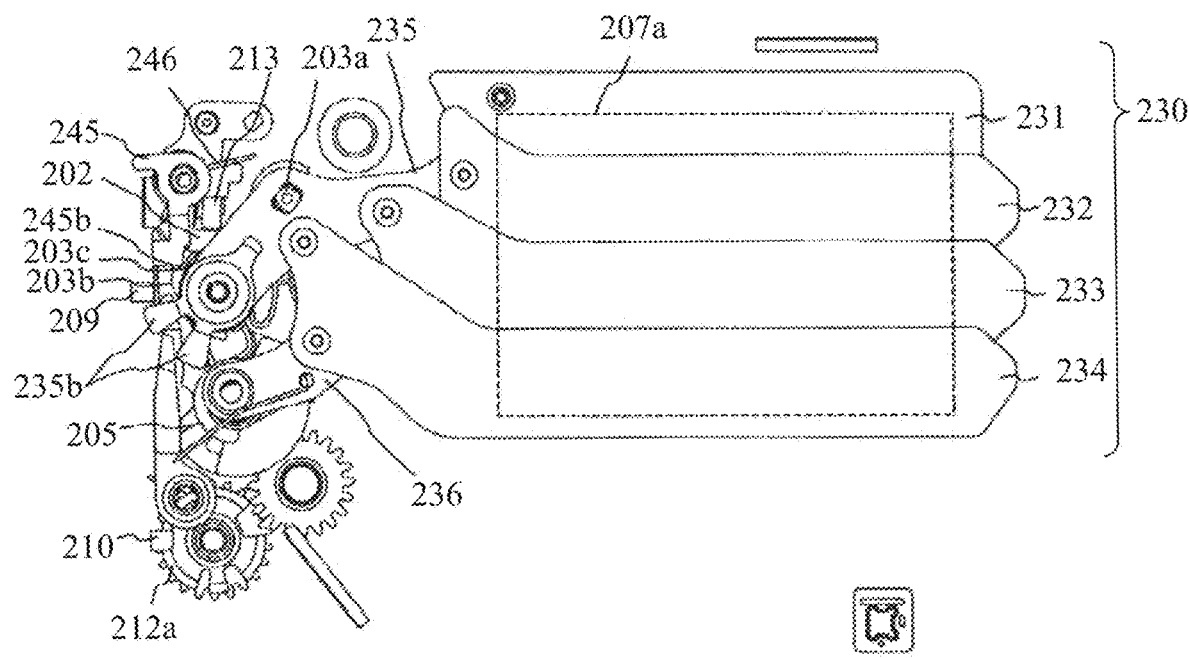
FIGS. 7A and 7B are plan views for explaining an operation of each component in a running completion state of the blade unit.
Figure 7B:
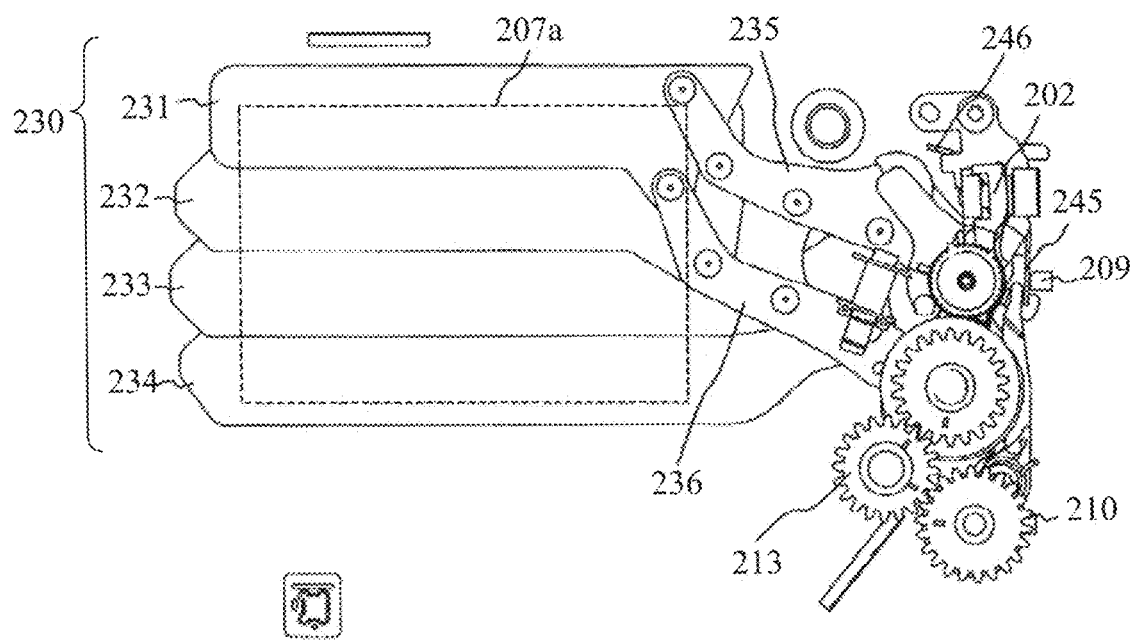
Figure 8A:
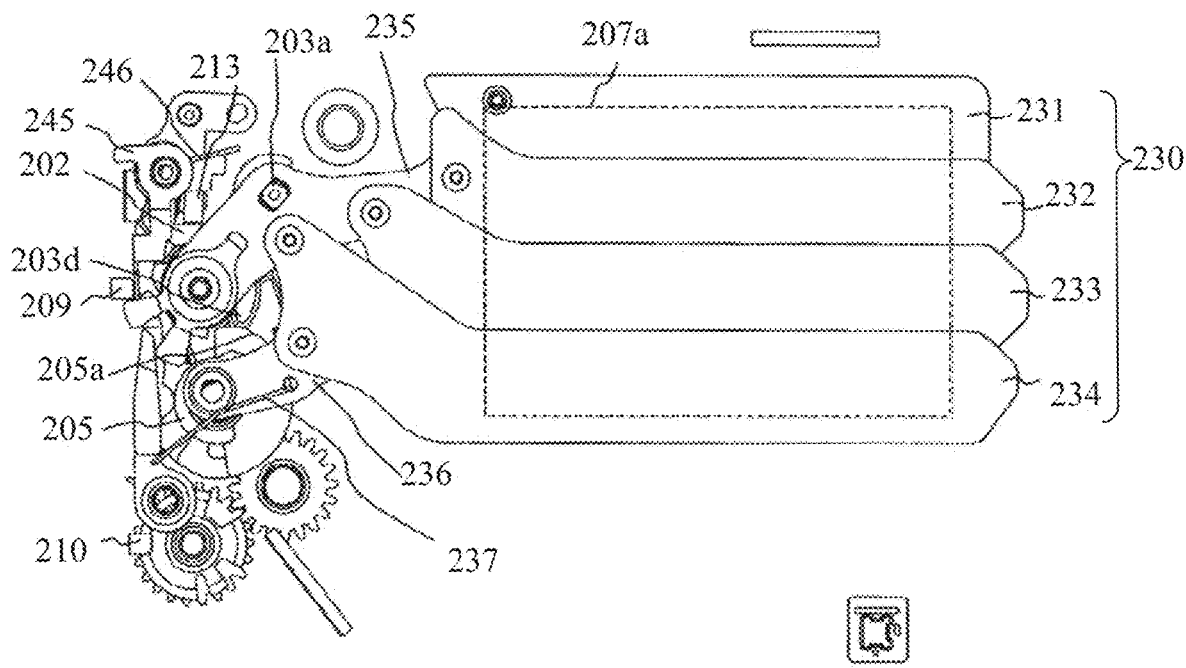
FIGS. 8A and 8B are plan views for explaining an operation of each component just before a charge operation of the driving member.
Figure 8B:
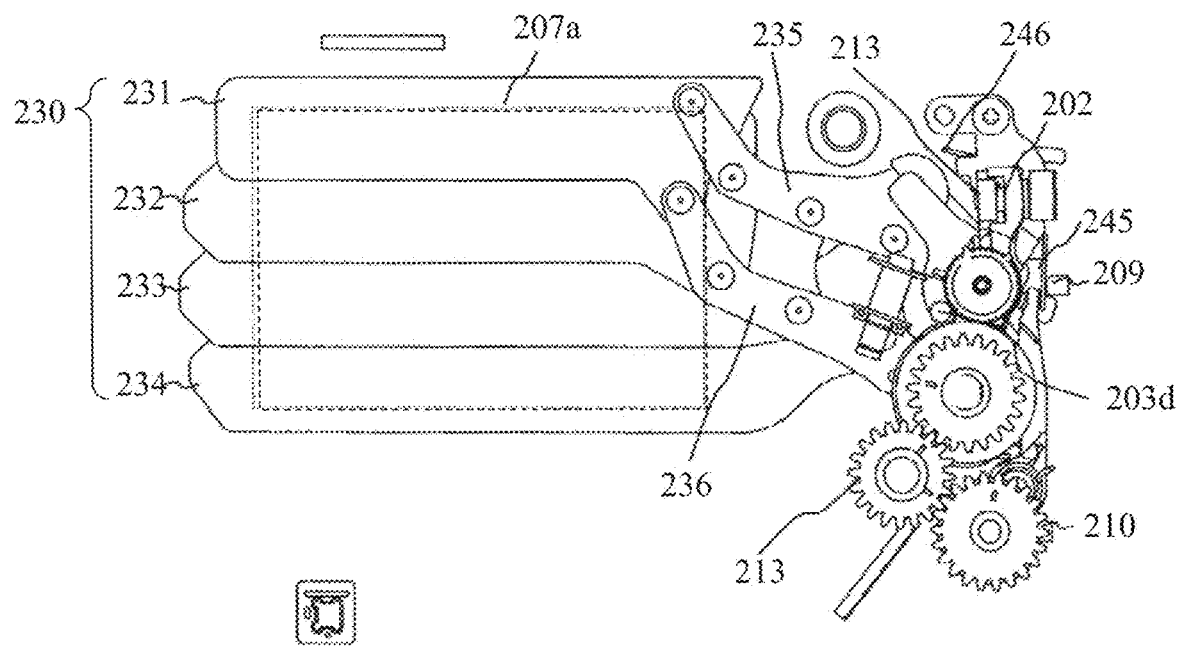
Figure 9A:
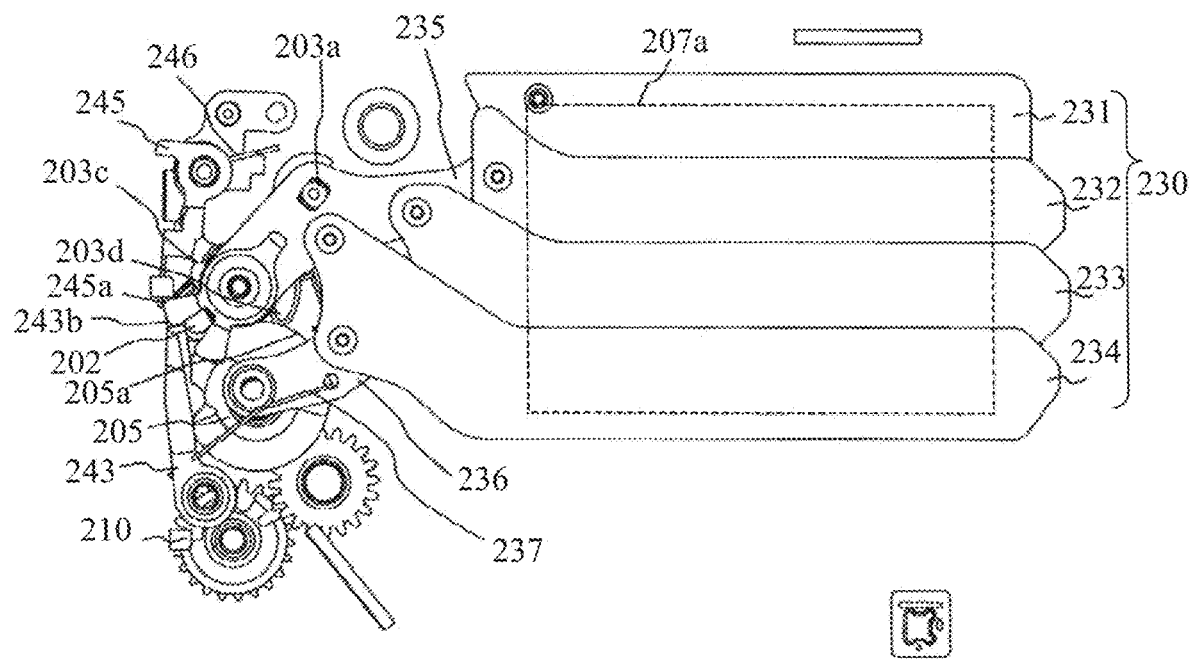
FIGS. 9A and 9B are plan views for explaining an operation of each component in a charge completion state of the driving member.
Figure 9B:
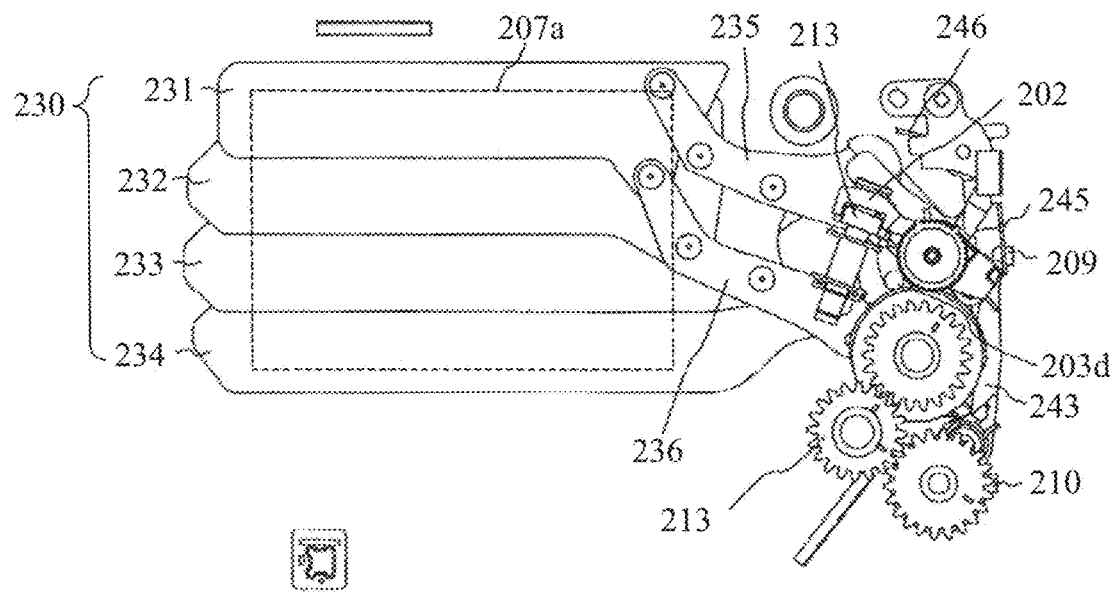
Figure 10A:
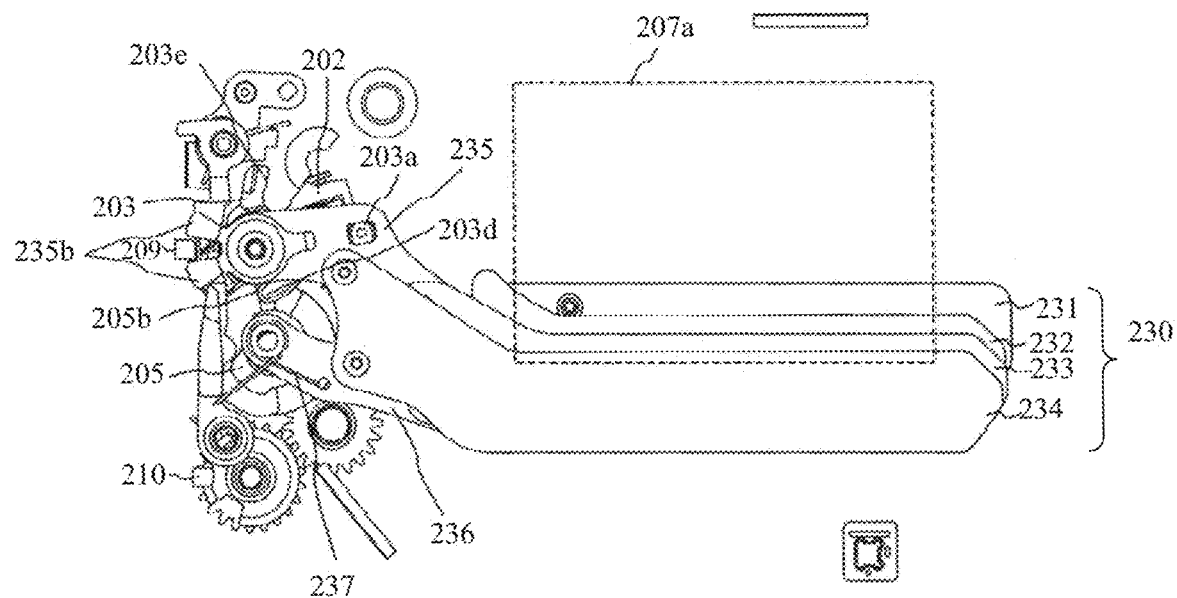
FIGS. 10A and 10B are plan views for explaining an operation of each component in the middle of return running.
Figure 10B:
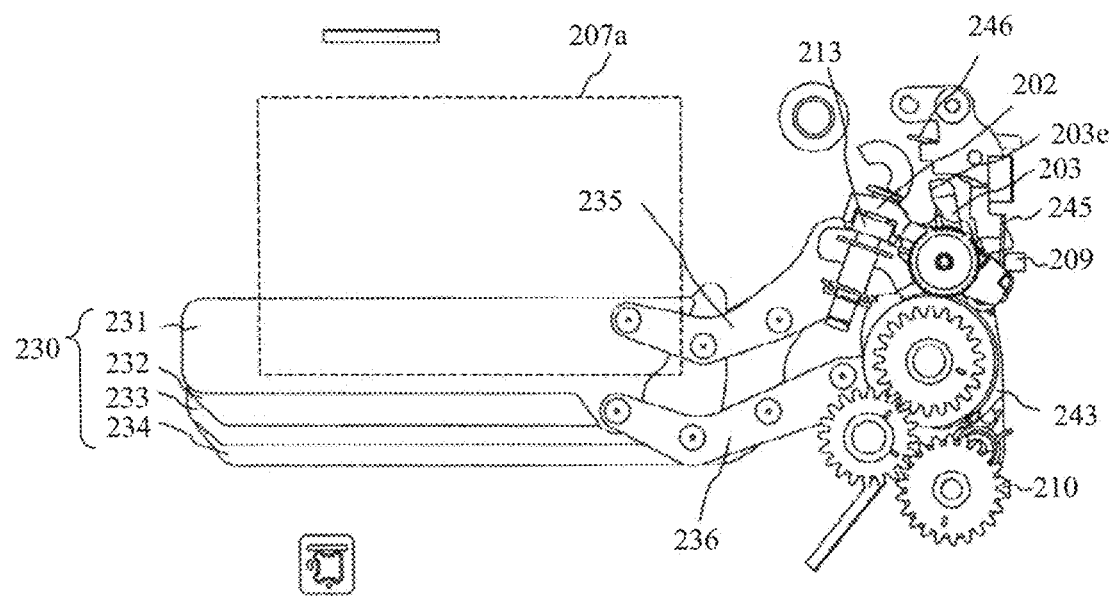

FIGS. 5A and 5B illustrate an operation of each component in an overcharged state of the driving member 202 or when the imaging apparatus 100 is stationary or in the live-view state. FIGS. 6A and 6B illustrate an operation of each component in the running standby state of the blade unit 230. FIGS. 7A and 7B illustrate an operation of each component in the running completion state of the blade unit 230. FIGS. 8A and 8B illustrate an operation of each component in the engagement state of the blade moving member 203 just before the charge operation of the driving member 202. FIGS. 9A and 9B illustrate an operation of each component in the subsequent charge completion state of the driving member 202. FIGS. 10A and 10B illustrate an operation of each component in the middle of return running.

Figure 11:
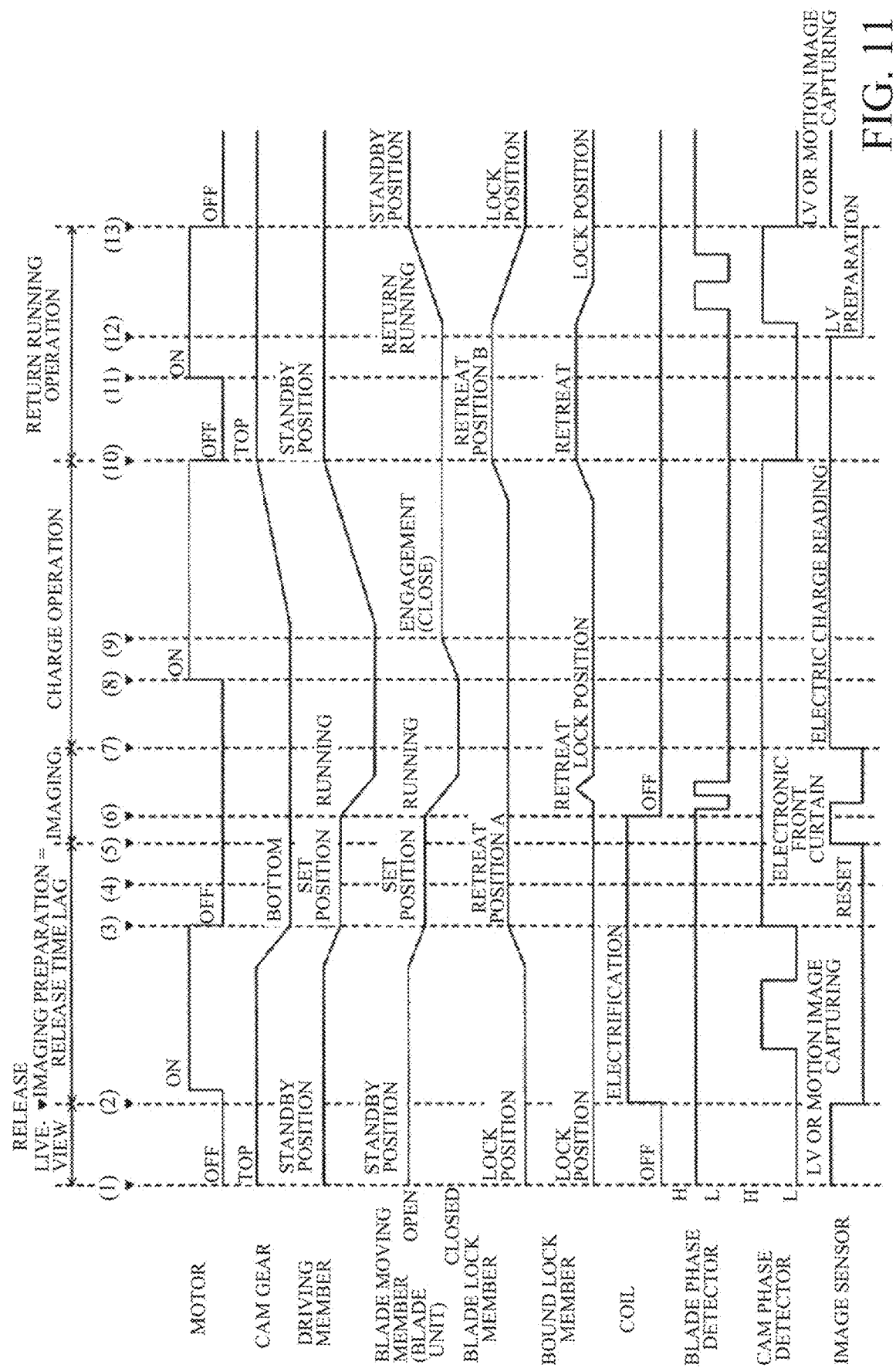
FIG. 11 is a timing chart illustrating operations of the shutter apparatus and the imaging apparatus.

FIG. 11 is a timing chart illustrating the operations of the shutter apparatus 2 and the image sensor 3. (1) to (13) in FIG. 11 correspond to the respective operation states. FIGS. 12A and 12B are rear views of the cam gear 204 and the blade cam 205 in FIGS. 5A and 5B. FIG. 13 illustrates a lock state of the bound lock member 245 in FIGS. 7A and 7B. FIG. 14 illustrates a lock state of the blade lock member 243 in FIGS. 5A and 5B. FIGS. 13 and 14 omit the shutter base plate 201, the auxiliary base plate 206, and the blade unit 230 for easy viewing of the figure.

In (1) illustrated in FIG. 11, the shutter apparatus 2 is in the overcharged state illustrated in FIG. 5A. Since the blade unit 230 is folded, the object light flux passes through the openings 201d and 207a. The imaging apparatus 100 can provide the live-view imaging, and display the object image incident on the image sensor 3 on the display unit 7. The blade moving member 203 remains stationary with the driving member 202 only by the urging force of the return running spring 237. Thus, for example, when an excessive impact is applied to the imaging apparatus 100, the blade moving member 203 and the driving member 202 are separated from each other, the blade unit 230 projects in the imaging opening, and unnatural imaging may occur in the motion image capturing. However, this embodiment can avoid this problem, since the blade lock member 243 is in the lock state that engages the blade moving member 203, as illustrated in FIG. 14.

Then, the CPU 9 checks whether the blade phase detector 209 has an output of H and the cam phase detector 210 has an output of L. In other words, the CPU 9 determines whether the blade moving member 203 (or the blade unit 230) is in the open state and that the cam top portion 204a in the cam gear 204 contacts the charge roller 208. If the blade phase detector 209 has the output of L or the cam phase detector 210 has the output of H, the unillustrated motor is electrified via the shutter driving circuit 11 so that they have correct phases. Thereby, the blade moving member 203 is driven via the blade cam 205, and the driving member 202 is driven via the cam gear 204. This shutter driving method controls the shutter driving circuit 11 and the like so that the cam phase detector 210 detects that the cam gear 204 is engaged with the driving member 202 and the blade phase detector 209 detects that the blade unit 230 is in the open position.

When the release operation starts ((2) in FIG. 1), the CPU 9 electrifies the coil 253 and generates a magnetic force in the yoke 251. Thereby, the yoke 251 and the armature 213 are in the attraction state. After the yoke 251 and the armature 213 are in the attraction state, the CPU 9 electrifies the unillustrated motor and rotates the cam gear 204 counterclockwise in FIG. 5A. The charge roller 208 moves from the cam top portion 204a to the cam inclined portion 204b in the cam gear 204, and the cam phase detector 210 outputs L following H.

When the charge roller 208 slides on the cam inclined portion 204b, the driving member 202 gradually rotates integrally with the blade moving member 203 to release the overcharged state. At the same time, the cam contact portion 243a in the blade lock member 243 moves from the cam bottom 205c in the blade cam 205 to the running standby portion 205d and unlock the blade moving member 203. The second H in the output from the cam phase detector 210 is detected, and the unillustrated motor is stopped.

As illustrated in FIGS. 6A and 6B, the blade unit 230 moves to the set position and enters the running standby state ((3) in FIG. 11). Then, where the blade unit 230 changes from the stop state to the running standby state, moving the blade moving member 203 as slowly as possible to the set position can quickly stabilize the blade unit 230. Hence, the CPU 9 uses the L or H signal from the cam phase detector 210 and controls the rotation speed of the unillustrated motor via the shutter driving circuit 11 partially at a low speed (such as at the lowest speed).

After all pixels on the image sensor 3 are reset ((4) in FIG. 11), the electronic front curtain scan starts ((5) in FIG. 11). The electronic front curtain scan has a scanning pattern suitable for the running characteristic of the blade unit 230. After a time corresponding to the set shutter speed elapses, the electrification of the coil 253 is turned off ((6) in FIG. 11). Then, the attraction force between the yoke 251 and the armature 213 disappears. The driving member 202 and the blade moving member 203 are urged by the blade driving spring 241 and start rotating counterclockwise in FIG. 6A.

As the drive member 202 and the blade moving member 203 further run, the bound lock member 245 contacts the bound lock contact portion 243b in the blade lock member 243 and is retreated once to the outside of the locus of the blade moving member 203. As the running further proceeds, the bound lock member 245 moves to the bound lock engagement portion 203c by the urging force of the bound lock return spring 246.

Thereafter, a shock absorbing member 242 absorbs the impact of the blade driving pin 203a and the blade driving pin 203a stops. Then, the blade moving member 203 attempts to return to the clockwise direction in FIG. 7A due to the repulsion caused by the collision. However, as illustrated in FIG. 13, a lock portion 245b in the bound lock member 245 serves as a stopper for the bound lock engagement portion 203c in the blade moving member 203, and the opening forming end of the blade unit 230 never reaches the opening again. The exposure of the blade unit 230 is then completed, and the opening 201d in the shutter base plate 201 is shielded from the object light flux ((7) in FIG. 11), as illustrated in FIGS. 7A and 7B.

When the blade unit 230 completes running and the image sensor 3 is completely shielded from light, the charge reading scan starts. Then, the CPU 9 determines whether the blade phase detector 209 has an output of L and the cam phase detector 210 has an output of H. In other words, the CPU 9 determines whether the blade moving member 203 finishes running and the charge roller 208 is positioned at the cam bottom in the cam gear 204. If the blade phase detector 209 has an output of H and the cam phase detector 210 has an output of L, abnormal conditions are suspected in the blade unit 230 and the blade moving member 203, and thus the CPU 9 stops the imaging operation and makes the display unit 7 display an error. It is necessary to keep the object light flux shielded at a location where the charge reading has not yet completed.

A predetermined time passes after the blade unit 230 completes running ((8) in FIG. 11), the CPU 9 energizes the unillustrated motor via the shutter driving circuit 11 and rotates the cam gear 204 and the blade cam 205 in the counterclockwise direction illustrated in FIG. 7A for the charge operation.

First, as the cam top 205a in the blade cam 205 moves into the locus of the blade moving member 203 as illustrated in FIGS. 8A and 8B, the cam follower 203d is engaged with the blade cam 205 and the light shielding state is maintained by the blade unit 230.

Subsequently ((9) in FIG. 11), the driving member 202 rotates clockwise in FIG. 8A against the urging force of the blade driving spring 241, and the overcharged state is established in which the armature 213 attached to the driving member 202 contacts the yoke 251. At the same time, the bound lock member 245 is retreated from the bound lock engagement portion 203c in the blade moving member 203 by the blade cam 205 via the blade lock member 243 ((10) in FIG. 11). Hence, the charge operation of the driving member 202 completes, and the charge reading completion of the image sensor 3 is waited for, as illustrated in FIGS. 9A and 9B.

A predetermined time passes after the charge reading starts from the image sensor 3 ((11) in FIG. 11), the CPU 9 again electrifies the unillustrated motor via the shutter driving circuit 11. Thus, the return running operation is performed which rotates the cam gear 204 and the blade cam 205 counterclockwise in FIG. 10A, and returns the blade unit 230 to the standby position. When the cam follower 203d in the blade moving member 203 moves from the cam top 205a towards the return running cam 205b as the blade cam 205 rotates, the blade unit 230 is gradually folded by the urging force of the return running spring 237 and the opening 201d is gradually opened.

Then, the CPU 9 may control the shutter driving circuit 11 etc. so as to accelerate the rotation speed of the blade cam 205 after the blade moving member 203 contacts the blade cam 205. This configuration can promptly move to the next imaging, and further improve the continuous capturing frame rate. The CPU 9 can recognize that the blade moving member 203 contacts the blade cam 205 based on the outputs of the blade phase detector 209 and the cam phase detector 210, the unillustrated timekeeper, and the unillustrated detector configured to physically detect a contact.

The blade moving member 203 is once separated from the blade cam member 205 after the blade unit 230 moves, and the blade unit 230 contacts the blade cam member 205 again after passing through the center of the opening 201d. Since the inertia of the blade moving member 203 and the blade unit 230 are different from each other, separately moving them can shorten the stabilization time.

The return running operation is completed since the blade moving member 203 contacts the driving member 202 which stands by (or is engaged) in the overcharged state through a driving member contact portion 203e. Then, if the rotation speed of the blade cam 205 is much faster than that of the blade moving member 203, a large impact when the return running completes causes a long stabilization time of the blade unit 230 (to attenuate the vibration).

Accordingly, the CPU 9 partly changes the rotational speed of the unillustrated motor via the shutter driving circuit 11 based on the output change of (detection result) of the blade phase detector 209 in order of L, H, and L. For example, the CPU 9 rotates the motor at a first speed or as fast as possible in an area where the opening forming end of the blade unit 230 passes most of the openings 201d and 207a, and sufficiently decelerates it down to a second speed just before the driving member contact portion 203e collides with the driving member 202. Further, the CPU 9 drives the motor at a high speed again or at a third speed after the blade moving member 203 and the driving member 202 are integrated and the blade moving member 203 separates from the blade cam 205. The second speed is lower than each of the first speed and the third speed. This configuration has advantages in promptly shifting to the next imaging while necessarily and sufficiently reducing the impact caused by the return running of the blade unit 230, and can further improve the continuous capturing frame rate. In addition, this configuration can reduce any impacts and abrasions between the armature 213 and the yoke 251 that contact each other in the overcharged state and improve the durability. Thus, the CPU 9 provides a speed control using the cam gear 204 and the blade cam 205 based on the detection results of the blade phase detector 209 and the cam phase detector 210, as the blade unit 230 moves from the closed position to the open position of the openings 201d and 207a. The blade moving member 203 moves from the closed position to the open position while the driving member 202 is engaged with the cam gear 204.

On the other hand, the blade lock member 243 moves to the cam bottom 205c in the blade cam 205 at the same timing, and the blade lock portion 243c contacts the blade lock contact portion 203f in the blade moving member 203 by the urging force of the blade lock returning spring 244. When the return running of the blade moving member 203 proceeds, the blade lock member 243 moves from the blade lock contact portion 203f to the blade lock engagement portion 203g in the blade moving member 203, as illustrated in FIG. 14.

Parallel to the charge reading of the image sensor 3, the CPU 9 controls the return running operation of the blade unit 230. Then, in order to prevent the light leaking from the unshielded opening 201d from entering the pixels in the row which has not yet undergone the charge reading scan or so that the blade unit 230 does not overtake the charge reading row, the charge start time is advanced within a permissible range of the captured image. This configuration can shorten the entire sequence, and further improve the continuous capturing frame rate.

After the charge reading from the image sensor 3 is completed ((12) in FIG. 11), the blade unit 230 completes folding. Then, the CPU 9 stops the unillustrated motor via the shutter driving circuit 11 ((13) in FIG. 11) based on the output of L from the cam phase detector 210. Then, as illustrated in FIGS. 5A and 5B, the blade driving member 202 is in an overcharged state. When a specified time passes after the charge operation ends, the CPU 9 starts a live-view imaging operation for the motion image capturing or electronic viewfinder function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-244697, filed on Dec. 21, 2017, which is hereby incorporated by reference herein in its entirety.

What is claimed is:
1. A shutter apparatus comprising:
a blade unit configured to open and close an opening used for exposure;
a blade moving member (203) configured to move the blade unit between an open position and a closed position of the opening;
an urging member (241) configured to urge at least one of the blade unit and the blade moving member in a direction from the closed position to the open position of the opening; and a blade cam member (205) configured to contact the blade moving member as the blade unit moves from the closed position to the open position of the opening, wherein as the blade unit moves from the closed position to the open position of the opening, the blade moving member separates from the blade cam member after the blade unit moves, and the blade moving member again contacts the blade cam member after the blade unit passes through a center of the opening.

2. The shutter apparatus according to claim 1, wherein the blade cam member includes a first cam that includes a first portion having a cylindrical surface shape and a second portion having a planar shape, and wherein as the blade unit moves from the closed position to the open position of the opening, the blade moving member moves from the first portion to the second portion of the first cam.

3. The shutter apparatus according to claim 2, further comprising a blade lock member configured to restrict the blade cam member from moving, wherein the blade cam member includes a second cam engaged with the blade lock member and configured to restrict the blade moving member from moving when the blade unit is located at the open position of the opening.

4. The shutter apparatus according to claim 1, further comprising:

a driving member (202) configured to drive the blade moving member from the open position to the closed position of the opening; and a drive cam member (204) configured to move the driving member from the closed position to the open position of the opening and to engage the driving member as the blade unit moves from the closed position to the open position of the opening.

5. The shutter apparatus according to claim 4, wherein the blade moving member contacts the driving member when the blade unit completes moving to the open position.

6. The shutter apparatus according to claim 4, wherein the driving member and the blade moving member are coaxially rotatably supported.

7. The shutter apparatus according to claim 4, wherein the drive cam member and the blade cam member are coaxially rotatably supported.

8. An imaging apparatus comprising:
a shutter apparatus according to claim 1; and
an image sensor configured to capture an image of an object through the shutter apparatus.

9. An imaging apparatus comprising:
a shutter apparatus according to claim 4;
an image sensor configured to capture an image of an object via the shutter apparatus;
a first detector configured to detect a position of the drive cam member;
a second detector configured to detect a position of the blade unit; and
at least one processor or circuit configured to function as a first control unit configured to control driving of the drive cam member and the blade cam member.

10. The imaging apparatus according to claim 9, wherein the first control unit controls the drive cam member and the blade cam member in a live-view state so that the first detector detects that the drive cam member is located at a position for engaging the driving member and the second detector detects that the blade unit is located at the open position.

11. The imaging apparatus according to claim 9, wherein the at least one processor or circuit configured to function as a second control unit configured to control driving of the image sensor, and wherein the second control unit stops capturing an image by the image sensor, when the first detector does not detect a position at which the drive cam member is not engaged with the driving member or when the second detector does not detect that the blade unit completes moving to the closed position.

12. The imaging apparatus according to claim 9, wherein as the blade unit moves from the closed position to the open position of the opening, the first controller controls the drive cam member and the blade cam member based on the first detector and the second detector so as to accelerate a rotational speed of the blade cam member, after the blade moving member contacts the blade cam member.

13. The imaging apparatus according to claim 9, wherein at least one of the first detector and the second detector is a non-contact detector.

14. An imaging apparatus comprising:
a shutter apparatus according to claim 5;
an image sensor configured to capture an image of an object via the shutter apparatus;
a detector configured to detect a position of the blade unit; and
at least one processor or circuit configured to function as a control unit configured to control driving of the blade cam member.

15. The imaging apparatus according to claim 14, wherein as the blade unit moves from the closed position to the open position of the opening, the control unit controls the blade cam member based on a detection result of the detector so that a speed of the blade moving member contacting the driving member is smaller than a speed of the blade cam member passing through the opening.

16. The imaging apparatus according to claim 14, wherein as the blade unit moves from the closed position to the open position of the opening, the control unit controls the blade cam member based on a detection result of the detector so that a speed of the blade moving member contacting the driving member is smaller than a speed of the blade moving member separating from the blade cam member after the blade moving member contacts the drive member.

\* \* \* \* \*